Aug. 24, 1954  C. J. HEIM  2,687,135
STORAGE DEVICE
Filed Feb. 14, 1951  5 Sheets-Sheet 1

INVENTOR.
CARL J. HEIM
BY
Williams, Rich + Morse
ATTORNEYS

Aug. 24, 1954  C. J. HEIM  2,687,135
STORAGE DEVICE

Filed Feb. 14, 1951  5 Sheets-Sheet 1

INVENTOR.
CARL J. HEIM
BY
Williams, Rich + Morse
ATTORNEYS

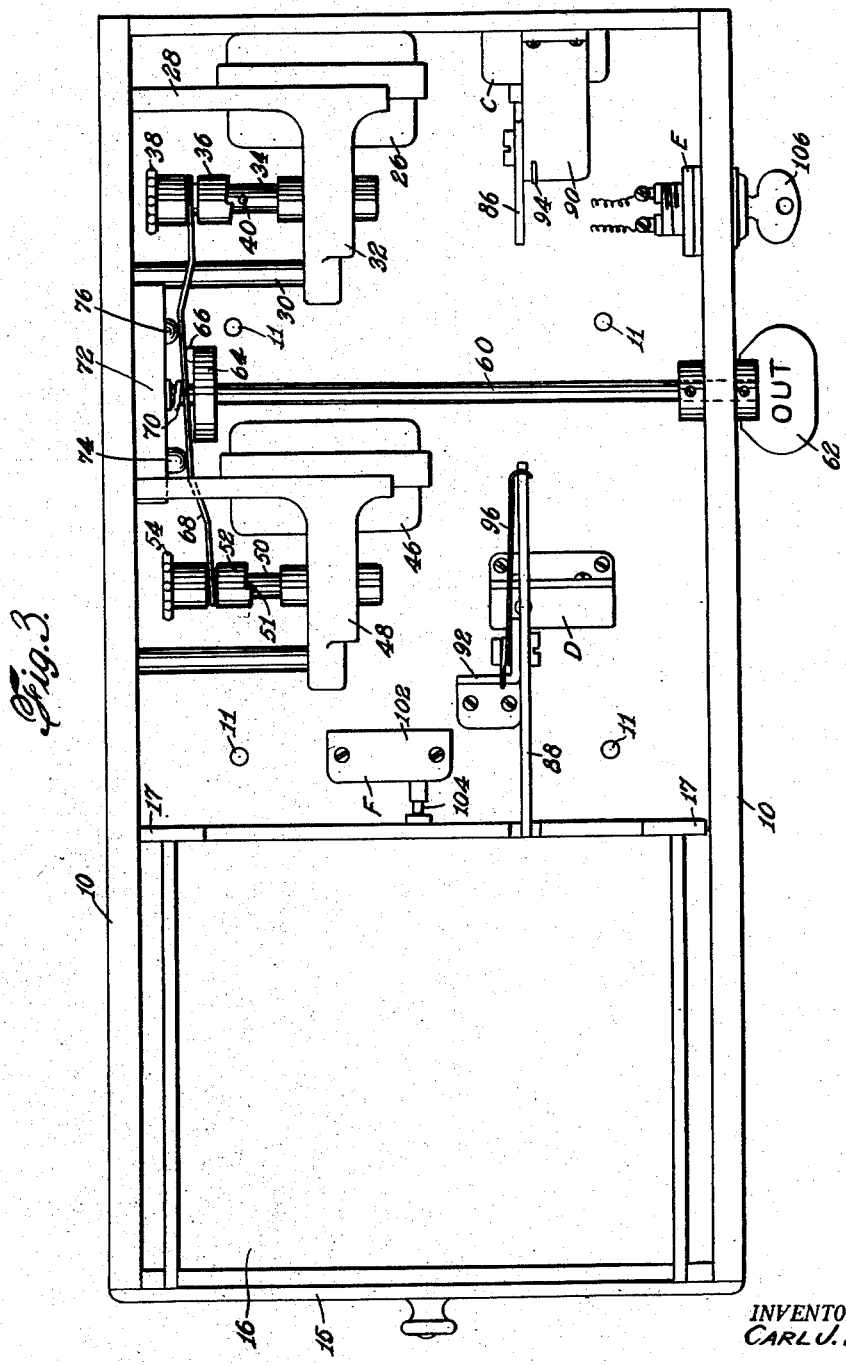

Aug. 24, 1954

C. J. HEIM
STORAGE DEVICE 2,687,135

Filed Feb. 14, 1951

INVENTOR.
CARL J. HEIM
BY
Williams, Rich + Morse
ATTORNEYS

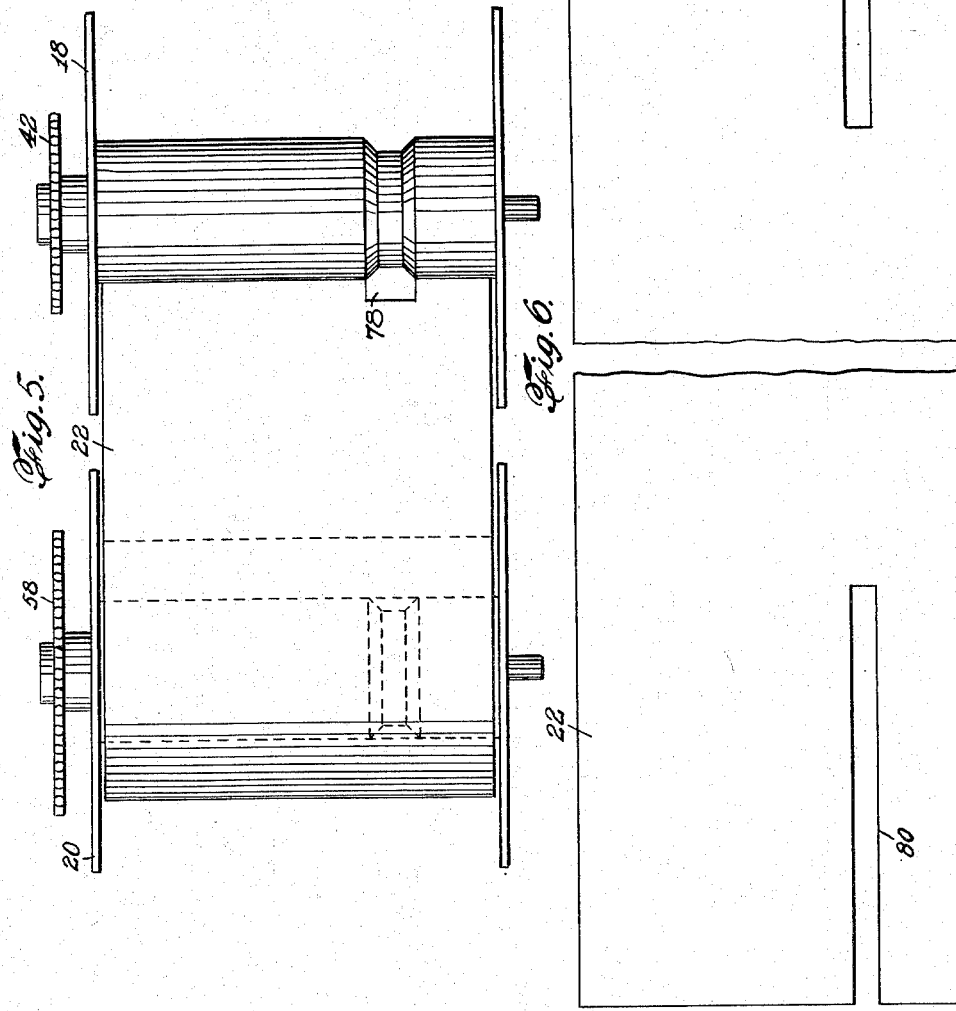

Patented Aug. 24, 1954

2,687,135

UNITED STATES PATENT OFFICE 2,687,135

STORAGE DEVICE

Carl J. Heim, New York, N. Y.

Application February 14, 1951, Serial No. 210,845

2 Claims. (Cl. 133—1)

This invention relates to a storage device which is particularly adapted and intended to be used in stores or other business places for the storage of the proprietor's surplus paper-money, but which may also be used for the storage of other articles such as bank checks and other papers, precious stones and other valuable small materials enclosed in envelopes, postage stamps, drugs, etc.

Researches have shown that most hold-ups of stores and other business places during business hours occur during a short period of time, usually a few minutes, because of the fears of the hold-up men that an alarm may be given and that they may be arrested during their illegal operations. Money may be easily taken from a cash register, and even if the proprietor has removed his surplus money to a place of hiding he may be subjected to violence or threats of violence which may induce him to disclose the hiding place. In many cases, if the proprietor can delay the hold-up men in their operations he is able to save at least a part of his money; and the achieving of this result is facilitated if the proprietor can convince the hold-up men that his surplus paper-money is stored in a place from which not even he can quickly obtain it.

The general object of the present invention is to provide a storage device, which is in the nature of a strongbox so mounted that it cannot be readily removed from the place where it is located; and into which paper-money and other articles may be inserted for safe keeping, and from which said articles may be withdrawn only comparatively slowly. The construction of the device is such that even though hold-up men compel the proprietor to operate the device both he and they are powerless to speed the delivery of the stored articles. Therefore, the hold-up men would be delayed in their operations, and owing to the lapse of time required for obtaining the stored money or other articles they may be discouraged and may flee the premises without making a complete haul of the loot which they seek. When the device is used for the storage of articles such as precious stones and drugs, it facilitates the distribution of those articles in small quantities as they are needed in the business, thereby facilitating accounting for them.

The invention will be understood from the preferred embodiment of it, hereinafter described as being intended primarily for the storage of paper money (although it may be used for other articles), which is illustrated in the accompanying drawings, in which Fig. 1 is a sectional elevation through the device;

Fig. 2 is a plan view with the top of the casing removed;

Fig. 3 is a plan view similar to Fig. 2, but without the spools and belt;

Fig. 5 is a plan view of the spools and belt; and

Fig. 6 is a plan view of the belt showing the slots near the ends thereof.

Figure 1:
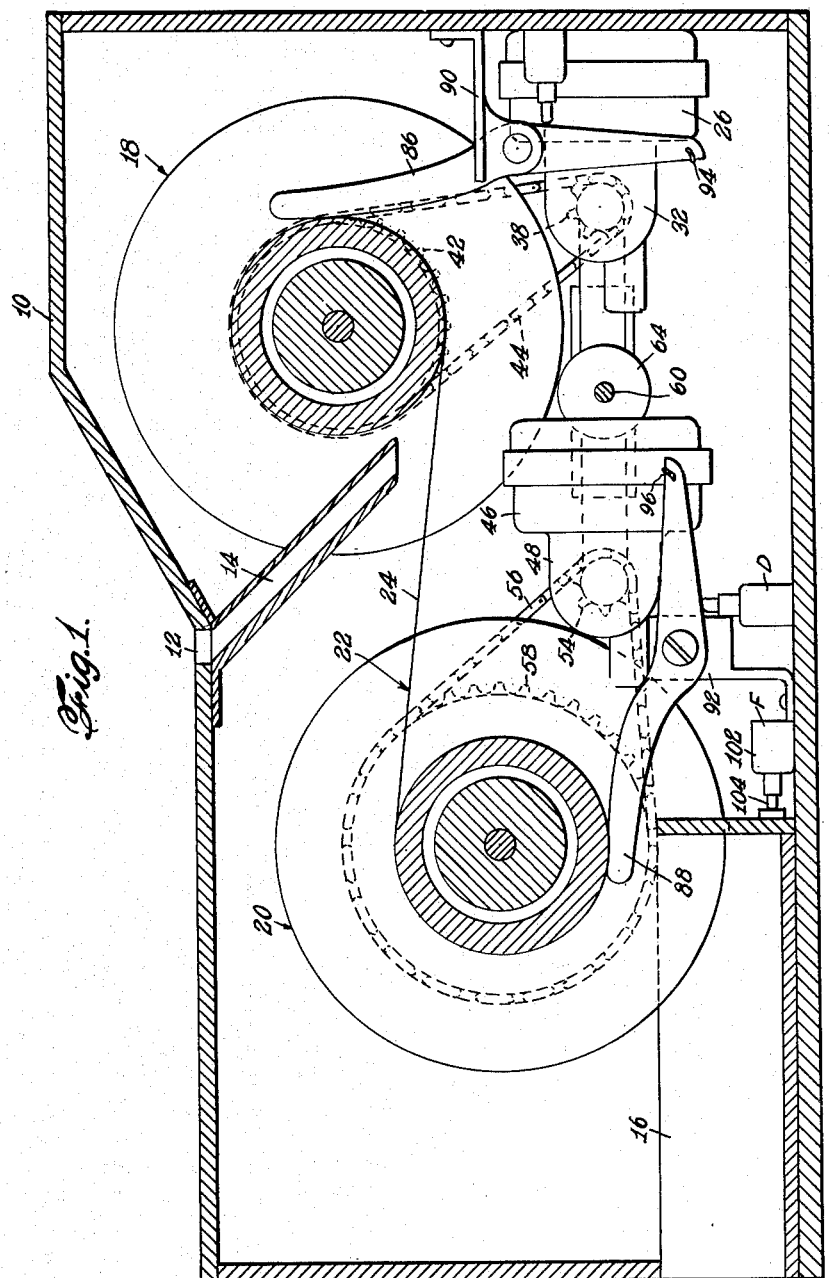
Figure 1:
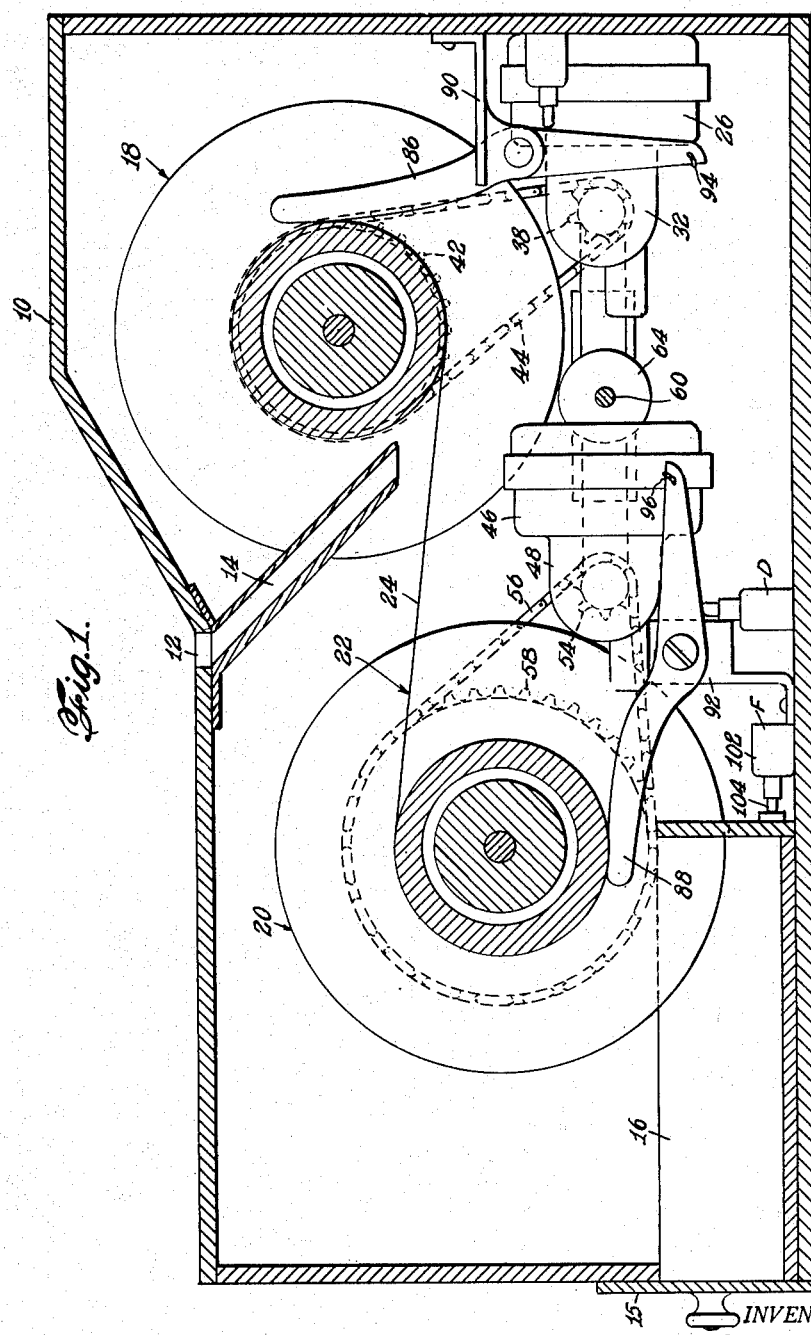

Referring to the drawings, the various parts of the storage device about to be described are enclosed within a casing 10, preferably of steel. This casing is adapted to be firmly secured in any suitable way within the premises where it is to be used so that it cannot be readily removed. Bolt receiving holes 11 for this purpose are shown in Fig. 3 in the bottom of the casing 10. As shown in Fig. 1, the casing 10 is provided with a slot 12 communicating with a chute 14 through which paper-money may be fed into the device for the purpose of storing it. The casing 10 is also provided with an opening which is closed by the front wall 15 of a drawer 16 into which the stored paper-money is fed by the machine when the removal of the money is desired, as hereinafter described. As shown in Fig. 3, the back wall of the drawer 16 projects at 17 beyond the side walls of the drawer and by engaging the end wall of the casing 10 prevents the drawer from being completely removed from the casing.

Rotatably mounted within the casing 10 are two spools 18 and 20 which are spaced apart with their axes horizontal. Cooperating with these spools 18 and 20, as shown in Fig. 1, and arranged to be wound-up on either of them is a belt 22 of heavy paper or other suitable material, having a substantially horizontal portion 24 which extends between the bottom of one spool and the top of the other spool and is located in cooperative relation to the lower end of the chute 14. It will be apparent, therefore, that when paper-money is fed down the chute 14 it will be included and stored between the wound layers of the belt as the belt is wound-up on the spool 18; and that, as the belt is wound-up on the spool 20, the stored paper-money will be conveyed on the top of the belt 22 until it reaches the spool 20 from which the money will drop into the drawer 16 from which it may be removed when the drawer is opened. As hereinafter described, provision is made for driving the spool 20 less rapidly than the spool 18, so that the rate at which the paper-money is delivered from the device is less rapid than the rate at which it may be fed to and stored in it.

The means by which the spools 18 and 20 are driven and controlled will now be described. As best shown in Fig. 3, the spool 18 is driven by an electric motor 26 of any suitable kind, mounted within the casing 10 on supports 28 and 30. Suitable gearing within the housing 32 transmits the power of the motor to the shaft 34 which is rotatably mounted in the housing 32. Arranged for sliding movement on the shaft 34, is a sleeve 36 having secured to it at one end a sprocket 38, and provided at the other end with a notched portion adapted to cooperate with a pin 40 passing through and secured to the shaft 34. Thus the sleeve 36 and the pin 40 act as a clutch between the shaft 34 and the sprocket 38. Cooperating with the sprocket 38 and a sprocket 42 rigidly secured to the spool 18, is a sprocket chain 44. The spool 20 is driven in a similar manner by an electric motor 46 which, through suitable gearing within the housing 48, drives the shaft 50 carrying a pin 51 which cooperates with the notched end of sleeve 52 rotatable on the shaft 50 and carrying a sprocket 54, all similar to the parts associated with the spool 18. A chain 56 serves as a driving connection between the sprocket 54 and a sprocket 58 secured to the shaft of the spool 20. It will be noted from Fig. 5 that, although the sprockets 38 and 54 may be alike and may be driven by motors rotating them at substantially the same speeds, the speed of rotation imparted to the spool 20 will be considerably less than the speed of rotation imparted to the spool 18, owing to the fact that the sprocket 58 is of considerably larger diameter than the sprocket 42. Therefore, as hereinbefore mentioned, paper-money may be withdrawn from the device only at a rate slower than the rate at which it may be fed to and stored in the device.

Figure 4:
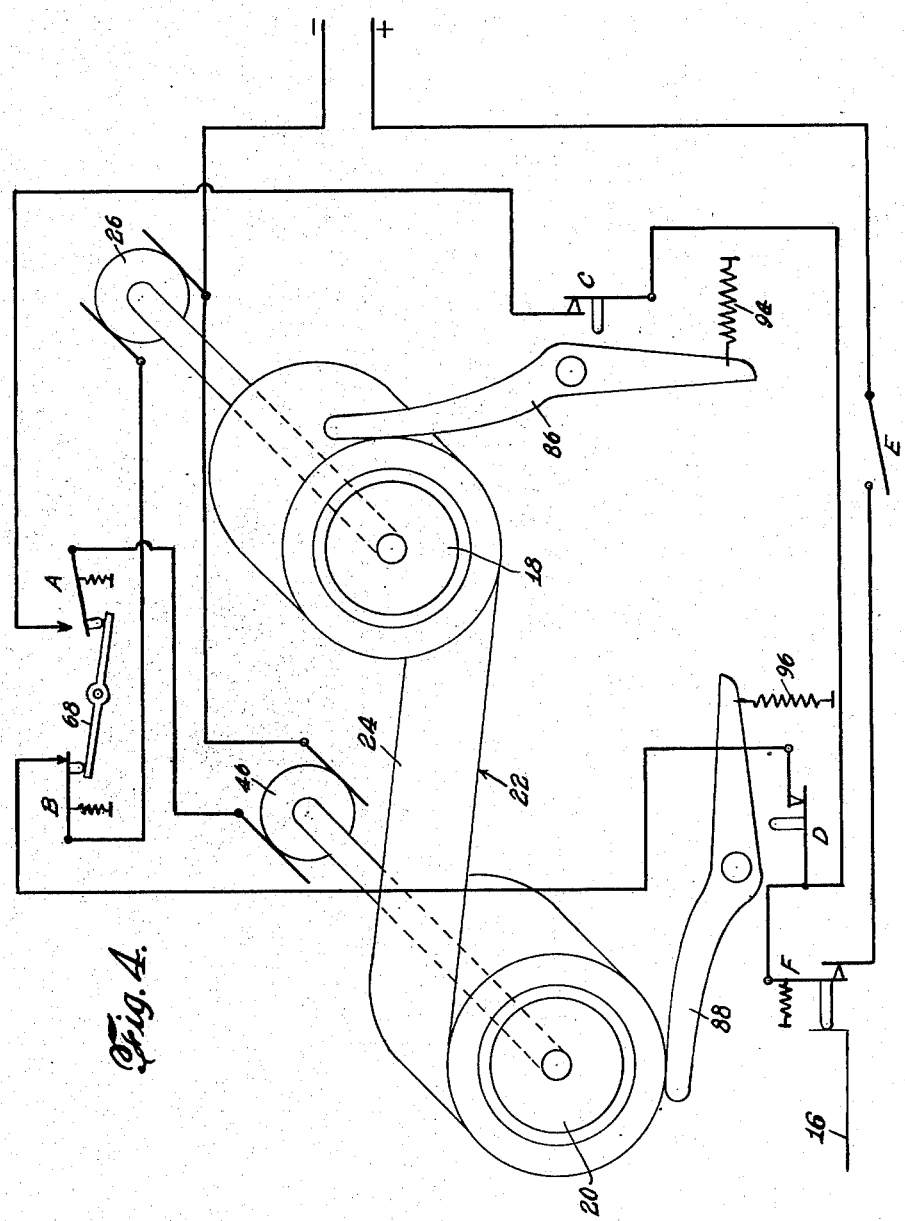
Fig. 4 is a schematic view illustrating the electrical circuits and the switches by which they are controlled.

The sleeves 36 and 52 may be manually and alternately moved so that the clutch mechanisms, of which those sleeves form a part, will transmit the power of either one motor or the other to the corresponding spool. As best shown in Fig. 3, this manually operable means comprises a shaft 60 rotatably mounted in the casing 10, and provided on its end externally of said casing with a thumb piece 62, and provided near its other end with a cam 64 secured to the shaft 60. The cam 64 has a cam-face 66 which cooperates with a yoke 68 provided at its center with a hole through which the shaft 60 passes, and at its ends with bifurcated portions which cooperate with grooves in the sleeves 36 and 52. A coil spring 70 surrounding the shaft 60 is interposed between the yoke 68 and the casing 72 of a switch box (hereinafter described) through which the shaft 60 passes. Thus it will be apparent that manual rotation of the shaft 60 by means of the thumb piece 62 will rotate the cam 64 thereby causing rocking of the yoke 68 thereby moving the sleeves 36 and 52 either to the position shown in Fig. 3 which causes rotation of the spool 20, or to a position which will cause rotation of the spool 18. As indicated in Figs. 2 and 3, the thumb piece 62 may be inscribed on its faces with the words "In" and "Out" so as to indicate when the device is manipulated either so as to take in and store paper-money, or so as to deliver the stored paper-money. Actuated by the rotation of the cam 64 and the movement of the yoke 68, are switch mechanisms A and B (Fig. 4) arranged within the housing 72. Any suitable switch mechanisms may be employed, the ones illustrated being characterized by spring-pressed plungers 74 and 76 which cooperate with the yoke 68 as shown in Figs. 3 and 4, the construction of these switch mechanisms being such that when the plungers 74 and 76 are in their inner positions the contacts controlled by them are closed, and when said plungers are in their outer positions said contacts are open. The purpose of these switch mechanisms and the circuits through them will be hereinafter described with the aid of Fig. 4.

As will be apparent from Figs. 5 and 6, the hubs of the spools 18 and 20 are grooved near one end; and the belt 22 is provided at each end with slots 78 and 80 which are so located that they are in alignment with those grooves when the belt 22 is wound on the spools 18 and 20. A means, cooperating with the belt 22 where it is wound on each spool and arranged to stop the winding rotation of either spool when substantially all of the belt has been wound-off the other spool, will now be described. This means comprises switch mechanisms C and D which are actuated respectively by levers 86 and 88 pivotally mounted on suitable brackets 90 and 92 secured to the casing 10 as best shown in Figs. 1 and 3. The levers 86 and 88 are yieldingly held by springs 94 and 96 so that said levers frictionally engage the belt 22 where it passes around the spools 18 and 20 respectively. Each lever 86 and 88 is located so that, when the slot 78 or 80 in the belt 22 exposes the groove in the hub of the spool 18 or 20, the lever cooperating with that spool will be moved by its spring into such a position that it will depress the plunger of its switch mechanism C or D, thereby opening the contacts in the switch mechanism. The circuits controlled by the switch mechanisms C and D will be hereinafter described with the aid of Fig. 4.

As shown in Fig. 2, electrical current for operating the motors 26 and 46 is supplied through a lock switch E interposed in one of the wires leading to the source of current. In order to prevent the device from being operated when the drawer 16 is open, a switch mechanism F is interposed in series with the switch E. This switch mechanism F has a plunger 104 cooperating with the rear wall of the drawer 16, the construction of said switch mechanism being such that its contacts are closed when the drawer is in its closed position, and are open when the drawer is pulled out.

With the aid of Fig. 4, the circuits through which current is supplied to the motors 26 and 46, and the manner in which the device is operated, will now be described. As represented in Fig. 4 the belt 22 is partly rolled-up on both of the spools 18 and 20; and the shaft 60 has been rotated by manipulation of the thumb piece 62 so that the notation "In" appears on its top side, thereby closing the switch B, allowing the switch A to open, moving the clutch associated with the motor 46 to its non-driving position, and moving the clutch associated with the motor 26 to its driving position. Since the belt 22 is partly wound upon both spools 18 and 20, the levers 86 and 88 permit the switches C and D to remain closed; and since the drawer 16 is in its closed position the switch F is also closed. Assuming that the storing of paper-money is desired, the lock switch E is closed, whereupon current is supplied to the motor 26 from the positive side of the source through the lock switch E, drawer switch F, switch D, switch B, and to the negative side of the source. Since the clutch associated with the motor 26 is closed (that is in driving position), the energization of that motor causes winding rotation of the spool 18, during which paper-money may be fed through the slot 12 and down the chute 14 on to the horizontal portion 24 of the belt 22, and said money is wound-up within the layers of the belt as they accumulate on the spool 18. When substantially all of the belt 22 has been wound-up on the spool 18, the slot 80 (in the end of the belt which is attached to the spool 20) is uncovered, thereby permitting movement of the lever 88 under the influence of the spring 96 to the position in which said lever moves the switch D to its open position. When the user wishes to remove the paper-money from the device, he rotates the shaft 60 to the position in which the notation "Out" on the thumb piece 62 is uppermost. This opens the clutch associated with the motor 26 and closes the clutch associated with the motor 46; and opens the switch B and closes the switch A. Assuming that the lock switch E and drawer switch F are both closed, current then flows from the positive side of the line through the switches E, F, C and A to the motor 46, and back to the negative side of the line. Such energization of the motor 46 causes rotation of the spool 20 and the winding-up of the belt therein, with the result that the stored paper-money is delivered from the belt 22 into the drawer 16 from which it may be removed as desired. If the winding-up of the belt 22 on the spool 20 continues until nearly all of the belt is unwound from the spool 18, the slot 78 in the end of the belt associated with spool 18 will permit the lever 86 to move under the influence of its spring 94 and open the switch C, thereby interrupting the circuit to the motor 46 and preventing further winding up of the belt 22 on the spool 20. Of course, the movement of the belt 22 may be stopped at any time by opening the lock switch E, or by rotating the shaft 60 by means of the thumb-piece 62 thereby opening the switches A and B, or by pulling out drawer 16 which permits the switch F to open. When the device is not in use, of course the key 106 should be removed from the lock switch E in order to prevent unauthorized use of the device. Improper removal, through the chute 14 and the slot 12, of articles stored in the device is practically impossible; and since, as hereinbefore explained, the drawer 16 may not be entirely removed from the casing 10, it is impossible for anyone to insert his hand through the delivery opening into the casing for the purpose of tampering with the device mechanism.

From the foregoing description of a preferred embodiment of the invention, it will be apparent that a device is provided in which paper-money and other articles may be rapidly stored, and from which said money and articles may be withdrawn only at a slower rate, thereby accomplishing the general objects of the invention.

It is to be understood that the device illustrated and described may be modified without departing from the spirit of the invention as defined in the claims hereto appended. For example, the mechanism might be driven by a spring motor or by a crank operated by hand.

What is claimed is:

1. A storage device comprising, a protective casing, said casing being provided with a first opening to receive articles to be stored and a second opening to discharge said articles, a first rotatable, article receiving, spool horizontally disposed within the casing, a second, article dispensing, spool horizontally journaled within the casing parallel to but spaced from the first spool, an elongated article transporting belt carried between the spools and passing across the first opening and wound about said spools so as to present an article receiving surface beneath the first opening, a source of rotary motion consisting of a first electric motor, a source of electrical potential connected to the motor and a first drive member in engagement with the first motor and connected to the first spool to wind the belt in a receiving direction upon the said first spool at a given rate, a source of rotary motion consisting of a second electric motor connected to the source of potential and a second drive member in engagement with the second motor and connected to the second spool to wind the belt in a dispensing direction toward the second opening upon the second spool at a rate substantially slower than that of the first spool, spool arresting arms pivotally secured in slidable contact with the belt adjacent the first and second spools, means to stop the sources of rotary motion controllable by the arms, arm operating means carried by and adjacent each end of the belt whereby the arms are caused to trip the stop means and rotation of the spools is stopped short of the ends of the belt and control means for selectively operating either of the sources of rotary motion.

2. A storage device comprising, a protective casing, said casing being provided with a first opening to receive articles to be stored and a second opening to discharge said articles, a first rotatable, article receiving, spool horizontally disposed within the casing, a second, article dispensing, spool horizontally journaled within the casing parallel to but spaced from the first spool, an elongated article transporting belt carried between the spools and passing across the first opening and wound about said spools so as to present an article receiving surface beneath the first opening, a source of rotary motion consisting of a first electric motor, a source of electrical potential connected to the motor and a first drive member in engagement with the first motor and connected to the first spool to wind the belt in a receiving direction upon said first spool at a given rate, a source of rotary motion consisting of a second electric motor connected to the source of potential and a second drive member in engagement with the second motor and connected to the second spool to wind the belt in a dispensing direction toward the second opening upon the second spool at a rate substantially slower than that of the first spool, spool arresting arms pivotally secured in slidable contact with the belt adjacent the first and second spools, switches operated by the motion of the arms, said switches being connected between the source of potential and the first and second motors respectively, arm operating means carried by and adjacent each end of the belt whereby the arms are caused to trip the switches and the rotation of the spools is stopped short of the ends of the belt and control means for selectively operating either of the sources of rotary motion.

References Cited in the file of this patent

UNITED STATES PATENTS

| Number | Name | Date |
| --- | --- | --- |
| 732,337 | Clemons | June 20, 1903 |
| 985,516 | Dupont et al. | Feb. 28, 1911 |
| 1,178,342 | Overlin | Apr. 4, 1916 |
| 1,953,073 | Chiger | Apr. 3, 1934 |
| 2,009,385 | Chiger | July 30, 1935 |
| 2,508,159 | Haas | May 16, 1950 |
| 2,602,719 | Thiene et al. | July 8, 1952 |

FOREIGN PATENTS

| Number | Country | Date |
| --- | --- | --- |
| 693,953 | France | Sept. 8, 1930 |
| 702,080 | France | Jan. 19, 1931 |